(No Model.)

M. L. SCHOCH
DIPPER.

No. 432,905. Patented July 22, 1890.

WITNESSES:
John W. Weemer
C. Sedgwick

INVENTOR:
M. L. Schoch
BY
Munn & Co.
ATTORNEYS

UNITED STATES PATENT OFFICE.

MARTIN L. SCHOCH, OF NEW BERLIN, PENNSYLVANIA.

DIPPER.

SPECIFICATION forming part of Letters Patent No. 432,905, dated July 22, 1890.

Application filed March 18, 1890. Serial No. 344,347. (No model.)

*To all whom it may concern:*

Be it known that I, MARTIN L. SCHOCH, of New Berlin, in the county of Union and State of Pennsylvania, have invented a new and Improved Dipper, of which the following is a full, clear, and exact description.

My invention relates to improvements in dippers, and more especially to that class of dippers or ladles that are used for dipping thick, sticky, or pasty substances. It is well known that in dipping such substances a large proportion of the matter dipped is inclined to adhere to the sides of the dipper, and that some object—such as the finger, a knife, spoon, or similar article—must be used to clean the material from the inner sides of the dipper.

The object of my invention is to obviate this difficulty by making a dipper that will be self-cleaning—that is, that will when emptied scrape the material from the inside of the dipper.

To this end my invention consists in a dipper having a set of scrapers arranged within the dipper and fitting against the bottom and sides of the same, and means for actuating said scrapers. This construction will be hereinafter fully described, and specifically pointed out in the claims.

Reference is to be had to the accompanying drawings, forming a part of this specification, in which similar letters of reference indicate corresponding parts in both the figures.

Figure 1:
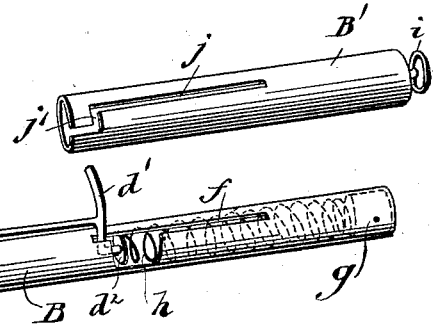
Figure 2:
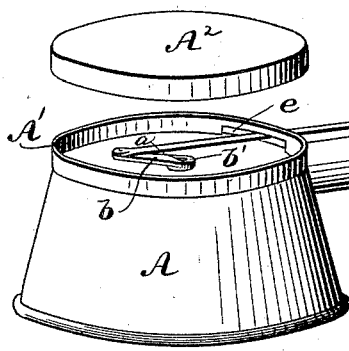
Figure 2:
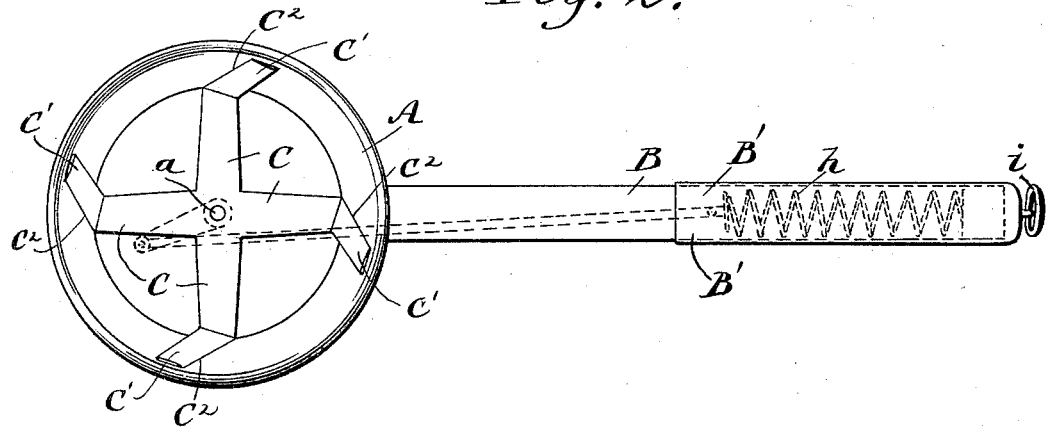

Figure 1 is a broken perspective view of an inverted dipper embodying my invention, with the bottom cover separated from the bottom and the sleeve from the end of the handle; and Fig. 2 is a plan of the dipper.

The dipper proper consists of a bowl A and handle B, which may be of any desired size and shape, the bowl and handle being connected in the usual manner. Pivoted to the bottom of the bowl A by the pin $a$ are the radial arms C, which lie closely upon the bottom of the bowl, and which are provided with upwardly-extending portions C', which fit closely against the sides of the bowl A.

The arms C are formed from a single piece of sheet metal, and the parts C' thereof extend nearly to the top of the bowl A, are slanted rearwardly at an angle of nearly forty-five degrees, and their front edges $C^2$ are bent outwardly, as shown in Fig. 2, so as to strike the sides of the dipper-bowl at an angle and fit closely against the same. They will thus be able to thoroughly clean the sides of the bowl. The radial arms C may be set so that the front edges will strike the bottom of the bowl at an angle in the same manner that the parts C' will strike the side of the bowl. The pin $a$, by which the arms C are attached to the bottom of the bowl A, should be removable, so that the arms may be taken out and washed when necessary. The pin $a$ projects through the bottom of the dipper-bowl, and to the lower end of the pin is fixed a crank $b$, having a thickened hub $b'$ to raise it from the bottom of the bowl, so that it may work freely; but a washer may be substituted for the hub, if desired.

The outer end of the crank $b$ is pivoted to a rod $d$, which extends through a slot $e$ in the bottom rim A' of the dipper, and beneath and parallel with the handle B to a point where it can be conveniently reached by the forefinger of the hand in which the handle is held, where it terminates in a curved finger-piece $d'$, by which it is operated.

One end of the finger-piece $d'$ extends below the handle B and at right angles with the same, that it may be conveniently reached by the finger, and the other end projects through the slot $f$ of the handle and terminates in a circular plate $d^2$, which fits within the handle B and is longitudinally movable in the same. The slot $f$ extends longitudinally along the under side of the handle, and the object of the slot is to permit the necessary movement of the finger-piece $d'$ and rod $d$.

The upper end of the handle B is closed by a plug $g$, between which and the plate $d^2$ is a spiral spring $h$, which fits nicely within the handle, and by its pressure upon the plate $d^2$ normally holds the finger-piece $d'$ in the lower end of the slot $f$, as shown in Fig. 1. A sleeve B' fits closely upon the end of the handle B and serves to hold the plug $g$ in place. The sleeve has a ring $i$ in the end, by which the dipper may be hung up, and has a longitudinal slot $j$ in one side thereof, through which the finger-piece $d'$ projects. The slot $j$ should be in line with the slot $f$ when the sleeve is in position upon the handle, and it has an angular offset or bent portion $j'$ near the lower end of the sleeve, which brings the lower end of the slot $j$ out of line with the slot $f$. It is obvious that the sleeve B′ may be dispensed with and the plug $g$ fastened in the handle B in any other suitable manner.

The bottom of the bowl has a cover $A^2$, which fits closely upon the rim A′ and protects the crank $b$ and connection.

The dipper is operated as follows: It is filled with material in the usual manner, and when emptied the operator pulls upon the finger-piece $d'$, which will actuate the rod $d$ and crank $b$ and cause the arms C to turn in the bowl A, and as the arms C turn they will scrape the material in the bowl from the bottom and sides thereof, so that it will be entirely emptied. Upon releasing the finger-piece the spring $h$ will throw the parts back into position.

I do not confine myself to the precise arrangement of parts shown, as they may be greatly changed without departing from the principle of my invention—for instance, the number of the arms C might be changed or their shape altered.

Having thus described my invention, I claim as new and desire to secure by Letters Patent—

1. A dipper having radially-extending arms pivoted in the bowl-bottom and fitting against the bottom and sides thereof, a crank fixed to the pivot of the arms, and an operating-rod pivoted to the crank and extending parallel with the dipper-handle, substantially as described.

2. A dipper having radially-extending arms pivoted in the bottom of the bowl and fitting against the bottom and sides thereof, a crank fixed to the lower end of the pivot-pin, and a rod pivoted to the crank and extending parallel with the dipper-handle and terminating in a finger-piece, one end of which projects from the handle and the other projects through a slot in the handles and is actuated by a spring in the handle, substantially as described.

3. The combination, with the bowl A and handle B, having the slot $f$ therein, of the arms C, pivoted in the bowl A by the pin $a$, the crank $b$, fixed to said pin, and the spring-pressed rod $d$, pivoted to the crank and provided with a finger-piece $d'$, substantially as shown and described.

4. In a dipper, the combination, with the bowl A and handle B, having the slot $f$ and plug $g$ therein, of the arms C, pin $a$, crank $b$, spring-pressed rod $d$, pivoted to the crank and provided with the finger-piece $d'$, and the sleeve B′, adapted to fit upon the handle and provided with a slot to permit the necessary movement of the spring-rod, substantially as described.

MARTIN L. SCHOCH.

Witnesses:
J. L. C. GUTELIUS,
H. E. GUTELIUS.